(12) United States Patent
Liu et al.

(10) Patent No.: US 10,133,429 B2
(45) Date of Patent: Nov. 20, 2018

(54) SELF-CAPACITIVE TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Panhua Wang, Beijing (CN); Haisheng Wang, Beijing (CN); Xiaochuan Chen, Beijing (CN); Shengji Yang, Beijing (CN); Xiaoliang Ding, Beijing (CN); Ziwei Cui, Beijing (CN); Yanyan Yin, Beijing (CN); Jun Fan, Beijing (CN); Jiantao Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 106 days.

(21) Appl. No.: 15/086,960

(22) Filed: Mar. 31, 2016

(65) Prior Publication Data
US 2017/0083127 A1 Mar. 23, 2017

(30) Foreign Application Priority Data
Sep. 23, 2015 (CN) .......................... 2015 1 0614243

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0412* (2013.01); *G06F 3/0418* (2013.01)

(58) Field of Classification Search
USPC ........................................................ 345/174
See application file for complete search history.

(56) References Cited

U.S. PATENT DOCUMENTS

| 2010/0041431 A1* | 2/2010 | Kim | ...................... G06F 1/1624 455/550.1 |
| 2013/0076690 A1* | 3/2013 | Vellanki | .................. G06F 3/044 345/174 |

(Continued)

FOREIGN PATENT DOCUMENTS

| CN | 104465703 | 3/2015 |
| CN | 104698656 | 6/2015 |

(Continued)

OTHER PUBLICATIONS

Office Action from corresponding Chinese Application No. 201510614243.9 dated Sep. 29, 2017 (8 pages).

(Continued)

*Primary Examiner* — Srilakshmi K Kumar
*Assistant Examiner* — Chineyere Wills-Burns
(74) *Attorney, Agent, or Firm* — Harness, Dickey & Pierce, P.L.C.

(57) ABSTRACT

The present disclosure discloses a self-capacitive touch display panel and a display device, comprising: a substrate, and a plurality of top-emitting type organic electroluminescent structures disposed on the substrate and sharing one cathode. The self-capacitive touch display panel further comprises: a plurality of self-capacitive touch electrodes disposed at the same layer, positioned above the cathode and insulated with the cathode; a plurality of touch leads electrically connected with the plurality of self-capacitive touch electrodes; and a touch detection circuit, configured to (Continued)

determine a touch position by detecting the change of the capacitance values of the self-capacitive touch electrodes during a touch phase. The self-capacitive touch electrodes are connected with the touch detection circuit by way of the respective touch leads. The touch display panel reduces its thickness, guarantees a whole layer cathode structure of the organic electroluminescent structures and effectively guarantees the display quality.

6 Claims, 2 Drawing Sheets

(56) References Cited

U.S. PATENT DOCUMENTS

| | | | |
|---|---|---|---|
| 2014/0043285 A1* | 2/2014 | Tu | G06F 3/044 345/174 |
| 2014/0253493 A1* | 9/2014 | Cho | G06F 3/0412 345/174 |
| 2015/0049041 A1* | 2/2015 | Yousefpor | G06F 3/0412 345/174 |
| 2015/0153859 A1 | 6/2015 | Chen et al. | |
| 2015/0301676 A1* | 10/2015 | Xu | G06F 3/041 345/174 |
| 2016/0048239 A1* | 2/2016 | Zheng | G06F 3/0412 345/174 |
| 2016/0098114 A1* | 4/2016 | Pylvas | G06F 3/0412 345/174 |
| 2016/0147342 A1 | 5/2016 | Xiong et al. | |
| 2016/0170524 A1* | 6/2016 | Kim | G06F 3/044 345/174 |
| 2017/0147112 A1 | 5/2017 | Wang et al. | |
| 2017/0168646 A1 | 6/2017 | Yang et al. | |
| 2017/0222180 A1* | 8/2017 | Sato | H01L 51/5246 |

FOREIGN PATENT DOCUMENTS

| | | |
|---|---|---|
| CN | 104779267 A | 7/2015 |
| CN | 104850270 | 8/2015 |
| CN | 104915084 | 9/2015 |

OTHER PUBLICATIONS

Office Action from corresponding Chinese Application No. 201510614243.9 dated Jan. 26, 2018 (9 pages).

\* cited by examiner

SELF-CAPACITIVE TOUCH DISPLAY PANEL AND DISPLAY DEVICE

CROSS-REFERENCE TO RELATED APPLICATION

This application claims the benefit and priority of Chinese Patent Application No. 201510614243.9 filed Sep. 23, 2015. The entire disclosure of the above application is incorporated herein by reference.

FIELD

The present disclosure relates to the field of display technologies, and more particularly, to a self-capacitive touch display panel and a display device.

BACKGROUND

This section provides background information related to the present disclosure which is not necessarily prior art.

At present, an embedded touch technology becomes more and more popular with panel manufacturers because it may be compatible with a display panel technology. An existing embedded touch screen implements touch position detection by using a mutual-capacitance or self-capacitance technology. When the self-capacitance technology is used, a plurality of mutually insulated self-capacitance electrodes are disposed on the same layer of the touch screen. When a human body does not touch the screen, capacitance values of the self-capacitance electrodes are preset values. When the human body touches the screen, the capacitance values of the touched self-capacitance electrodes are changed. During the touch phase, a touch detection circuit may determine touch position by detecting the changes of the capacitance values of the self-capacitance electrodes.

In addition, an organic electroluminescent display (OLED) is one of focuses in the research field of existing flat panel displays. Compared with a liquid crystal display (LCD), the OLED has advantageous performance of low power consumption, high color saturation, wide viewing angle, thin thickness, fast response speed and realizable flexibility, etc. At present, in the fields of mobile phones, tablet computers and digital cameras or the like, the OLED begins to replace the traditional LCD.

How to integrate the embedded self-capacitive touch technology with the organic electroluminescent technology to form a new-type OLED having touch function is a technical problem to be urgently solved by persons skilled in the art.

SUMMARY

This section provides a general summary of the disclosure, and is not a comprehensive disclosure of its full scope or all of its features.

The self-capacitive touch display panel and the display device provided by embodiments of the present disclosure not only reduce the thickness of the touch display panel, but also guarantee a whole layer cathode structure of a display component and effectively guarantee the display quality of the original product.

According to a first aspect of the present disclosure, a self-capacitive touch display panel is provided, comprising: a substrate and a plurality of top-emitting type organic electroluminescent structures, which are disposed on the substrate and share one cathode. The self-capacitive touch display panel further comprising: a plurality of self-capacitive touch electrodes, which are disposed at the same layer, positioned above the cathode and insulated with the cathode; a plurality of touch leads, which are electrically connected with the plurality of self-capacitive touch electrodes; and a touch detection circuit, which is configured to determine a touch position by detecting the change of the capacitance values of the self-capacitive touch electrodes during a touch phase. The self-capacitive touch electrodes are connected with the touch detection circuit by way of the respective touch leads.

In the embodiments of the present disclosure, the cathode and an anode of the top-emitting type organic electroluminescent structure are inputted with a signal which is identical to a drive signal of the self-capacitive touch electrode, during the touch phase.

In the embodiments of the present disclosure, the top-emitting type organic electroluminescent structure is configured to display black image during the touch phase.

In the embodiments of the present disclosure, the self-capacitive touch display panel further comprising a resin insulating layer disposed between the cathode and the self-capacitive touch electrodes.

In the embodiments of the present disclosure, the top-emitting type organic electroluminescent structure is configured to display an image during the touch phase.

In the embodiments of the present disclosure, the self-capacitive touch electrode is made of a transparent conducting material.

In the embodiments of the present disclosure, the self-capacitive touch electrode is made of one or more of ITO, IZO, TO, TAO, IO, CdO or graphene.

In the embodiments of the present disclosure, the touch leads and the self-capacitive touch electrodes are positioned at the same layer and are made of the same material.

According to a second aspect of the present disclosure, the embodiments of the present disclosure further provide a display device comprising the above mentioned self-capacitive touch display panel provided by the embodiments of the present disclosure.

By adding the self-capacitive touch electrodes above the top-emitting type organic electroluminescent structures, the above mentioned touch display panel and the display device provided by the embodiments of the present disclosure integrate the embedded self-capacitive touch technology with the organic electroluminescent technology, the touch display panel and the display device not only reduce the thickness of the touch display panel, but also guarantee a whole layer cathode structure of the top-emitting type organic electroluminescent structures and effectively guarantee the display quality of the original product.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Thicknesses and shapes of various film layers in the accompanying drawings do not reflect the real ratio of the self-capacitive touch display panel, and are merely intended to illustrate the contents of the present disclosure.

Figure 1:
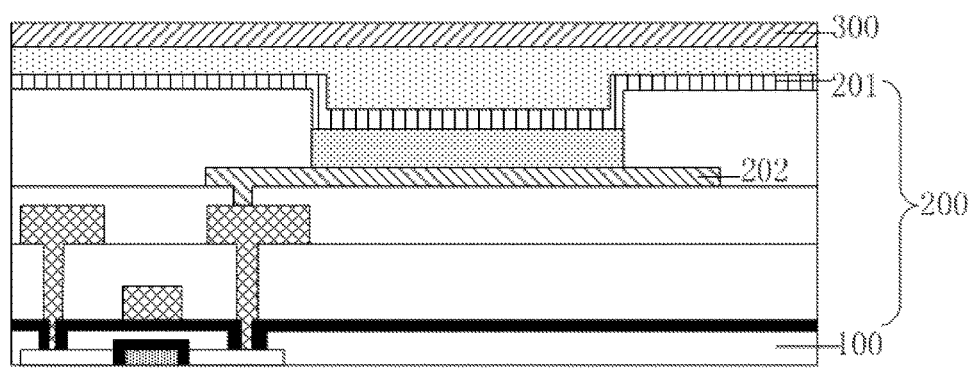
FIG. 1 is a structural schematic diagram of a self-capacitive touch display panel according to a first embodiment of the present disclosure.

FIG. 1 is a structural schematic diagram of a self-capacitive touch display panel according to a first embodiment of the present disclosure. As shown in FIG. 1, the self-capacitive touch display panel comprises: a substrate 100 and a plurality of top-emitting type organic electroluminescent structures, which are disposed on the substrate 100 and share one cathode 201. The self-capacitive touch display panel further comprises: a plurality of self-capacitive touch electrodes 300, which are disposed at the same layer, positioned above the cathode 201 and insulated with the cathode 201; a plurality of touch leads, which are electrically connected with the plurality of self-capacitive touch electrodes 300; and a touch detection circuit, which is configured to determine a touch position by detecting the change of the capacitance values of the self-capacitive touch electrodes 300 during a touch phase. The self-capacitive touch electrodes 300 are connected with the touch detection circuit by way of the respective touch lead. The touch detection circuit may be implemented by using a touch detection chip or a plurality of separate circuit components.

By adding the self-capacitive touch electrodes above the top-emitting type organic electroluminescent structures, the touch display panel provided by the embodiments of the present disclosure integrates the embedded self-capacitive touch technology with the organic electroluminescent technology, the touch display panel not only reduces the thickness of the touch display panel, but also guarantees a whole layer cathode structure of the top-emitting type organic electroluminescent structures and effectively guarantees the display quality of the original product.

Figure 2:
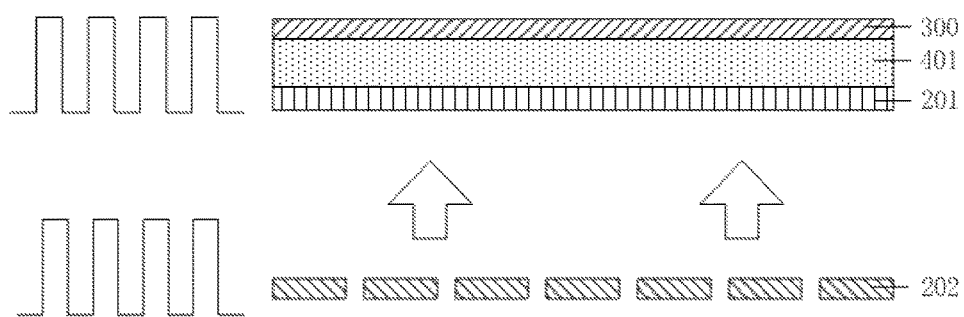
FIG. 2 is a first schematic diagram of a touch phase of the self-capacitive touch display panel in FIG. 1.

FIG. 2 is a first schematic diagram of a touch phase of the self-capacitive touch display panel in FIG. 1. In the embodiments of the present disclosure, in order to reduce the ground capacitances of the self-capacitive touch electrodes, as shown in FIG. 2, during a touch phase, when the touch detection circuit detects the change of the capacitance values of the respective self-capacitive touch electrodes, a signal identical to a drive signal of the self-capacitive touch electrode 300 may be inputted to the cathode 201 and anode 202 of the top-emitting type organic electroluminescent structure 200, namely, the self-capacitive touch display panel synchronously drives the cathode 201 and anode 202 of the top-emitting type organic electroluminescent structures 200 and the self-capacitive touch electrode 300 during a touch time range. In this way, the cathode, the anode and the self-capacitive touch electrode may be consistent in electric potential, and further the capacitance among them may be 0, it can be guaranteed that the effect of the capacitance between the self-capacitive touch electrode and the ground to the display function of the top-emitting type organic electroluminescent structure is counteract, and the output current, of the top-emitting type organic electroluminescent structures, for displaying is constant. In addition, as shown in FIG. 2, an insulating layer 401 is disposed between the cathode 201 and the self-capacitive touch electrodes 300, and the material of the insulating layer 401 is an insulating substance, which is not limited herein.

It is to be noted that if the top-emitting type organic electroluminescent structures adopt active drive, when the touch detection circuit detects the change of the capacitance values of the respective self-capacitive touch electrodes, the signal identical to the drive signal of the self-capacitive touch electrodes 300 also needs to be inputted to all metal electrodes of a pixel drive circuit configured to drive the top-emitting type organic electroluminescent structure so as to guarantee all the metal electrodes and the self-capacitive touch electrode are consistent in electric potential, namely, the capacitance between all the metal electrodes and the self-capacitive touch electrode is 0. In order to enable the self-capacitive touch display panel to simultaneously implement the touch function and the display function, every time after a frame of image is displayed, a time range for the touch detection circuit detecting the change of the capacitance values of the respective self-capacitive touch electrodes (touch phase) is set up, and a touch phase plus a display phase may constitute a frame time.

Further, in the embodiments of the present disclosure, during a touch phase, the top-emitting type organic electroluminescent structure may be configured to display black image. In this case, after a frame of image is displayed, a black image may be displayed before switching to a touch phase so that a switching diode in charge of controlling the top-emitting type organic electroluminescent structure to emit light is turned off during a touch phase and the top-emitting type organic electroluminescent structure display black image. In this way, no voltage signal for displaying is applied to the cathode and the anode, it can be better guaranteed that during a touch phase, the cathode, the anode and the self-capacitive touch electrode are consistent in electric potential, and the possible interference of a touch operation to the display function is eliminated.

Figure 3:
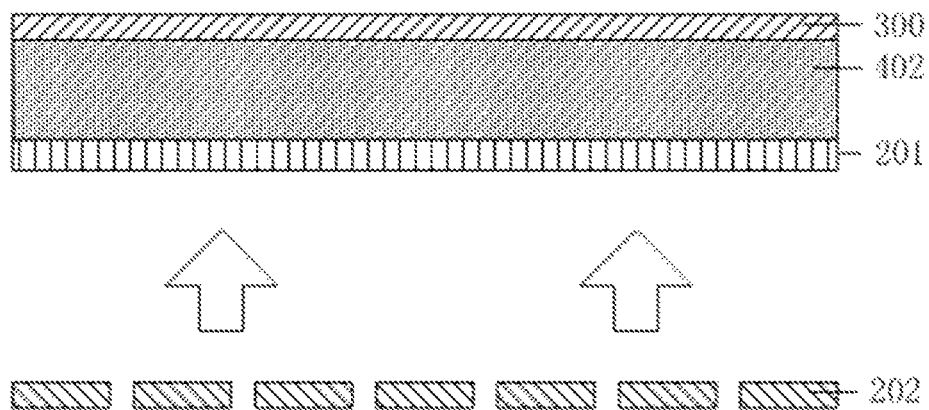
FIG. 3 is a second schematic diagram of the touch phase of the self-capacitive touch display panel in FIG. 1.

FIG. 3 is a second schematic diagram of the touch phase of the self-capacitive touch display panel in FIG. 1. In the embodiments of the present disclosure, as shown in FIG. 3, a resin insulating layer 402 may be disposed between the cathode 201 and the self-capacitive touch electrodes 300 for insulation. A resin material is good in insulation, and the thickness of the resin insulating layer 402 may be appropriately adjusted. A thicker resin may cause a smaller capacitance of the self-capacitive touch electrode relative to the cathode and anode of the top-emitting type organic electroluminescent structure, reduce the ground capacitance of the self-capacitive touch electrode, and reduce the effect of a touch operation to the display function. In this way, segmentation time for displaying a frame of black image does not need to exist between a display phase and a touch phase, it may be enabled that the display phase and the touch phase proceed simultaneously or continuously. Herein, the thickness of the resin insulating layer 402 may be adjusted according to actual application requirements and "thicker" denote a meaning that the effect of a touch operation to the display function is low enough to implement the basic objective of the present disclosure. In the present disclosure, it is unnecessary to specifically limit the thickness.

Therefore, as shown in FIG. 3, when a thicker resin insulating layer 402 is disposed between the cathode 201 and the self-capacitive touch electrodes 300, during a touch phase, the top-emitting type organic electroluminescent structures 200 may also display an image. In this way, touch and display may proceed simultaneously, and the performance of the touch display panel is improved.

In the embodiments of the present disclosure, in order to guarantee an aperture ratio of the self-capacitive touch display panel, the material of the self-capacitive touch electrodes may comprise a transparent conducting material. It is to be noted that the self-capacitive touch electrodes may be formed by way of vacuum thermal evaporation to effectively prevent water vapor from entering and protect the top-emitting type organic electroluminescent display structures. The self-capacitive touch electrodes may also be formed by way of printing, and a specifical method for forming the self-capacitive touch electrodes may be determined according to the actual situation, which is not limited herein.

In the embodiments of the present disclosure, the material of the self-capacitive touch electrode may comprise one or more of indium tin oxide (ITO), indium zinc oxide (IZO), tin oxide (TO), tin antimony oxide (TAO), indium oxide (TO), cadmium oxide (CdO) or graphene. Specifically, the specifical material of the self-capacitive touch electrodes may be selected according to the actual situation, which is not limited herein.

In the embodiments of the present disclosure, in order not to increase the complexity of processes, the touch leads and the self-capacitive touch electrodes may be positioned at the same layer and are made of the same material so that figures of the touch leads and the self-capacitive touch electrodes may be formed in the same composition process, thereby simplifying the process and saving the cost.

In the embodiments of the present disclosure, generally the self-capacitive touch display panel may also have other film layer structures such as a light emitting layer, a hole transport layer, an electron transport layer and the like, and generally structures such as thin-film transistors, gate lines, data lines and so on are formed on the substrate. And these specifical structures may have a plurality of implementation manners, which is not limited herein.

Based on the same inventive concept, the second embodiment of the present disclosure further provides a display device comprising the above mentioned self-capacitive touch display panel provided by the embodiments of the present disclosure. The display device may be any product or component having display function, such as a mobile phone, a tablet computer, a TV set, a display, a notebook computer, a digital photo frame, a navigation device and so on. Other essential components of the display device are comprehensible to persons of ordinary skill in the art, they are not necessarily described herein and shall not constitute a limitation of the present disclosure. The implementation of the display device may be seen in the embodiments of the above mentioned self-capacitive touch display panel, and what is repeated is not described again.

By adding the self-capacitive touch electrodes above the top-emitting type organic electroluminescent structures, the touch display panel and the display device provided by the embodiments of the present disclosure integrate the embedded self-capacitive touch technology with the organic electroluminescent technology, the touch display panel and the display device not only reduce the thickness of the touch display panel, but also guarantee a whole layer cathode structure of the organic electroluminescent structures and effectively guarantee the display quality of the original product.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A self-capacitive touch display panel comprising:
   a substrate;
   a plurality of top-emitting type organic electroluminescent structures positioned on the substrate and sharing one cathode;
   a plurality of self-capacitive touch electrodes positioned at the same layer above the cathode and insulated from the cathode;
   a resin insulating layer positioned between the cathode and the plurality of self-capacitive touch electrodes;
   a plurality of touch leads electrically connected with the plurality of self-capacitive touch electrodes; and
   a touch detection circuit configured to determine a touch position by detecting a change of capacitance values of the self-capacitive touch electrodes during a touch phase;
   wherein the self-capacitive touch electrodes are connected to the touch detection circuit by the respective touch leads;
   wherein the cathode and an anode of at least one of the top-emitting type organic electroluminescent structures are each coupled to receive during the touch phase a signal that is identical to a drive signal of at least one of the self-capacitive touch electrodes;
   wherein the plurality of top-emitting type organic electroluminescent structures are configured to display an image during the touch phase by supplying the drive signal to the cathode and the anode of the at least one of the top-emitting type organic electroluminescent structures while simultaneously supplying the drive signal to the at least one of the self-capacitive touch electrodes; and
   wherein the resin insulating layer is configured to insulate the cathode and the plurality of self-capacitive touch electrodes to reduce a capacitance between the cathode and the plurality of self-capacitive touch electrodes and reduce a capacitance between the plurality of self-capacitive touch electrodes and a ground, so a display phase and the touch phase of the self-capacitive touch display panel can proceed simultaneously during a frame time.

2. The self-capacitive touch display panel according to claim 1, wherein the plurality of top-emitting type organic electroluminescent structures are configured to display a black image during the touch phase.

3. The self-capacitive touch display panel according to claim 1 wherein the self-capacitive touch electrode comprises a transparent conducting material.

4. The self-capacitive touch display panel according to claim 1 wherein the self-capacitive touch electrode comprises one or more of ITO, IZO, TO, TAO, IO, CdO or graphene.

5. The self-capacitive touch display panel according to claim 1 wherein the touch leads and the self-capacitive touch electrodes are positioned at the same layer and comprise the same material.

6. A display device comprising a self-capacitive touch display panel according to claim 1.

\* \* \* \* \*